(12) United States Patent
Ganti et al.

(10) Patent No.: US 7,333,813 B2
(45) Date of Patent: Feb. 19, 2008

(54) METHODS AND DEVICES FOR ASSIGNING MOBILE DEVICES TO BASE STATIONS IN THE PRESENCE OF INTERFERENCE

(75) Inventors: Anand Ganti, Albuquerque, NM (US); Mark Haner, Westfield, NJ (US); Thierry E. Klein, Westfield, NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 627 days.

(21) Appl. No.: 10/457,456

(22) Filed: Jun. 10, 2003

(65) Prior Publication Data
US 2004/0253962 A1    Dec. 16, 2004

(51) Int. Cl.
*H04Q 7/20* (2006.01)
(52) U.S. Cl. .............. 455/452.1; 455/62; 455/63.1; 455/67.11; 455/67.13; 455/69; 455/115.3; 455/134; 455/135; 455/501; 455/513; 455/522
(58) Field of Classification Search ............ 455/62, 455/63.1, 67.11, 67.13, 69, 115.3, 134, 135, 455/501, 513, 522
See application file for complete search history.

(56) References Cited

U.S. PATENT DOCUMENTS

| 5,293,640 | A | * | 3/1994 | Gunmar et al. | 455/446 |
| 5,623,484 | A | * | 4/1997 | Muszynski | 370/335 |
| 5,809,430 | A | * | 9/1998 | D'Amico | 455/525 |
| 5,862,124 | A | * | 1/1999 | Hottinen et al. | 370/335 |
| 6,154,450 | A | * | 11/2000 | Wallentin et al. | 455/522 |
| 6,275,703 | B1 | * | 8/2001 | Kalev | 455/436 |

* cited by examiner

*Primary Examiner*—Nay Maung

(57) ABSTRACT

Mobile devices are assigned to their correct base stations after taking into consideration interference from all other mobile devices. The resulting assignments are more efficient than previous assignments. In addition, transmit power levels are assigned after each mobile device is assigned to a base station. The assigned power levels allow for more efficient use of power during the transmission of data signals.

6 Claims, 5 Drawing Sheets

FIG. 3

ASSIGN CONSTANT POWER TO ALL THE USERS: $P_i = P_{av,\,i}$ ~301
INITIALIZATION: n=1, ..., N $$a_{ij} = 0$$

$$S_j[0] = \{\,\}$$

~302

$$q_{ij}[1] = \frac{h_{ij}^2 P_{av,\,i}}{\sigma_j^2}$$

ITERATION n;
   SELECTION STEP:

$$(i^*[n],\, j^*[n]) = \arg\max_{(l,\,k)} q_{ij}[n]$$

~303

ASSIGNMENT STEP:

$$a_{i^*[n]\,j^*[n]} = 1$$

~304

UPDATE 1: FOR $j \neq j^*[n]$ $$S_j[n] = S_j[n-1]$$
$$q_{ij}[n+1] = q_{ij}[n]$$

~305

UPDATE 2:

$$S_{j^*[n]}[n] = S_{j^*[n]}[n-1] \cup \{U_{i^*[n]}\}$$

~306

UPDATE 3: FOR $l \notin \bigcup_j S_{j[n]}$ $$q_{lj^*[n]}[n+1] = \frac{q_{lj^*[n]}}{1 + \sum_{i\,/\,U_i \in S_{j}[n]} q_{ij}}$$

1. GIVEN AN ASSIGNMENT $\{a_{ij}\}$ OF USERS TO BASE STATIONS, DEFINE:

$$\tilde{j}(i) = \arg\max_{k \in \{1, ..., M\}} \tilde{q}_{ik} \quad \sim 401$$

WHERE $\tilde{q}_{ik}$ IS THE SIGNAL-TO-INTERFERENCE-PLUS-NOISE RATIO OF USER $U_i$ AT BASE STATION $B_k$ UNDER ASSIGNMENT $\{a_{ij}\}$.

2. SELECTION STEP: CHOOSE $i$ SUCH THAT:

$$a_{ij} = 1, \text{ with } j \neq \tilde{j}(i) \quad \sim 402$$

3. UPDATE STEP:

$$\tilde{a}_{ij} = 0$$
$$\tilde{a}_{ij(i)} = 1 \quad \sim 403$$
$$\tilde{a}_{lk} = \tilde{a}_{lk}, \text{ for } (l, k) \neq (i, j)$$

4. ITERATE UNTIL CONVERGENCE OF THE ASSIGNMENT DECISIONS. $\sim 404$

FIG. 5

1. INITIALIZATION:

$$P_j(H) = 0;$$
$$a_j(H) = 0;$$
$$\lambda_j[0] = 1;$$

~501

2. AT ITERATION n OF THE ALGORITHM, EXECUTE THE FOLLOWING STEPS:
3. COMPUTE ADJUSTED CHANNEL GAIN MATRIX $\tilde{H}$.

$$\tilde{h}_{ij} = \frac{h_{ij}}{\lambda_j[n]}$$ ~502

4. SELECTION STEP: SELECT (i, j) SUCH THAT $\tilde{h}_{ij}$ IS MAXIMUM AMONG ALL ELEMENTS OF $\tilde{H}$.   ~503
5. UPDATE STEP AND ASSIGNMENT:
   - A. $a_j(H) = j$ ~504
   - B. DELETE ROW i AND j FROM MATRIX $\tilde{H}$. ~505
   - C. POWER ALLOCATION FOR USER $U_j$:

$$P_j(H) = \max\left\{0, \lambda_j[n] - \frac{\sigma_j^2}{h_{ij}^2}\right\}$$ ~506

6. REPEAT STEPS 4 AND 5 UNTIL EITHER ALL ROWS OR ALL COLUMNS ARE DELETED.   ~507
7. REPEAT STEPS 1 TO 6 FOR ALL POSSIBLE CHANNEL MATRICES H.
8. CALCULATION OF AVERAGE POWER USED:   ~508

$$E[P_j(H)] = \int_H f_j(H) P_j(H) dH$$ ~509

9. COMPARISON WITH POWER CONSTRAINT AND UPDATE OF LAGRANGE MULTIPLIERS:

$$\lambda_j[n+1] = \lambda_j[n] + \frac{\beta}{n}\{P_{av} - E[P_j(H)]\}$$ ~510

10. REPEAT STEPS 2 TO 9 UNTIL CONVERGENCE OF THE LAGRANGE MULTIPLIERS. ~511

METHODS AND DEVICES FOR ASSIGNING MOBILE DEVICES TO BASE STATIONS IN THE PRESENCE OF INTERFERENCE

BACKGROUND OF THE INVENTION

To ensure that a mobile device (e.g., a wireless telephone) receives a desired signal, most wireless networks incorporate one or more techniques for assigning the mobile device to an appropriate base station. A typical wireless network may contain tens or hundreds of base stations set up throughout a geographic region to service thousands of mobile devices. Generally speaking, the base stations remain fixed while the mobile devices are designed to move from place to place. As a mobile device moves from one region to another, the signal it is receiving or transmitting may be handled by a different base station. That is, a particular mobile device may be "handed off" from one base station to another as it moves from one region to another.

There exist techniques for determining which base station is the appropriate or most desired base station to service a particular mobile device. For example, one technique involves measuring the signal strength of a pilot tone transmitted by a mobile device. In this technique, the pilot tone transmitted by a single mobile device is received by multiple base stations. At each base station (or alternatively, at the mobile device if the pilot tone is transmitted by the base station), the signal strength is measured. The base stations are then ranked based on the relative signal strength measured. The base station having the highest signal strength is given the highest ranking while the base station having the weakest signal strength is given the lowest ranking.

However, techniques that assign mobile devices to base stations based solely on signal strength have their drawbacks. One drawback is that such techniques fail to take into account "interference" from other mobile devices that are assigned to the same base station. That is, the signal from a mobile device, as measured at a given base station, may be subject to interference from other mobile devices using the same base station. This interference factor is not considered by existing assignment techniques.

In addition, techniques that assign base stations based simply on signal strength are not flexible enough to assign the most efficient transmit power level to a given mobile device under a set of given channel conditions.

Accordingly, it is a desire of the present invention to provide for techniques which assign mobile devices to base stations which take into account interference from other devices which may be assigned to the same base station and which select an appropriate transmit power level for data communications given a set of channel conditions.

SUMMARY OF THE INVENTION

The present invention provides techniques for assigning mobile devices to base stations after taking into consideration interference from all other relevant mobile devices (i.e., those transmitting at the same frequency). One technique involves determining an effective signal strength for each mobile device and an associated base station, where the effective signal strength takes into account the interference from other mobile devices. After the effective signal strength is determined, it is compared to other effective signal strengths associated with other base stations. Based on the results of this comparison, each mobile device is assigned to an appropriate base station. After being assigned to a base station, each mobile device is additionally assigned a transmit power level for the efficient transmission of data signals.

BRIEF DESCRIPTION OF THE DRAWINGS

FIG. 3 depicts a flow diagram of a technique for assigning substantially stationary mobile devices to base stations according to one embodiment of the invention.

FIG. 4 depicts a flow diagram of a technique for correcting previous mobile device assignments according to another embodiment of the present invention.

FIG. 5 depicts a flow diagram of a technique for assigning mobile devices, which are moving, to base stations, taking into account interference values, and also assigning appropriate transmit power levels according to yet another embodiment of the present invention.

DETAILED DESCRIPTION OF THE INVENTION

Figure 1:
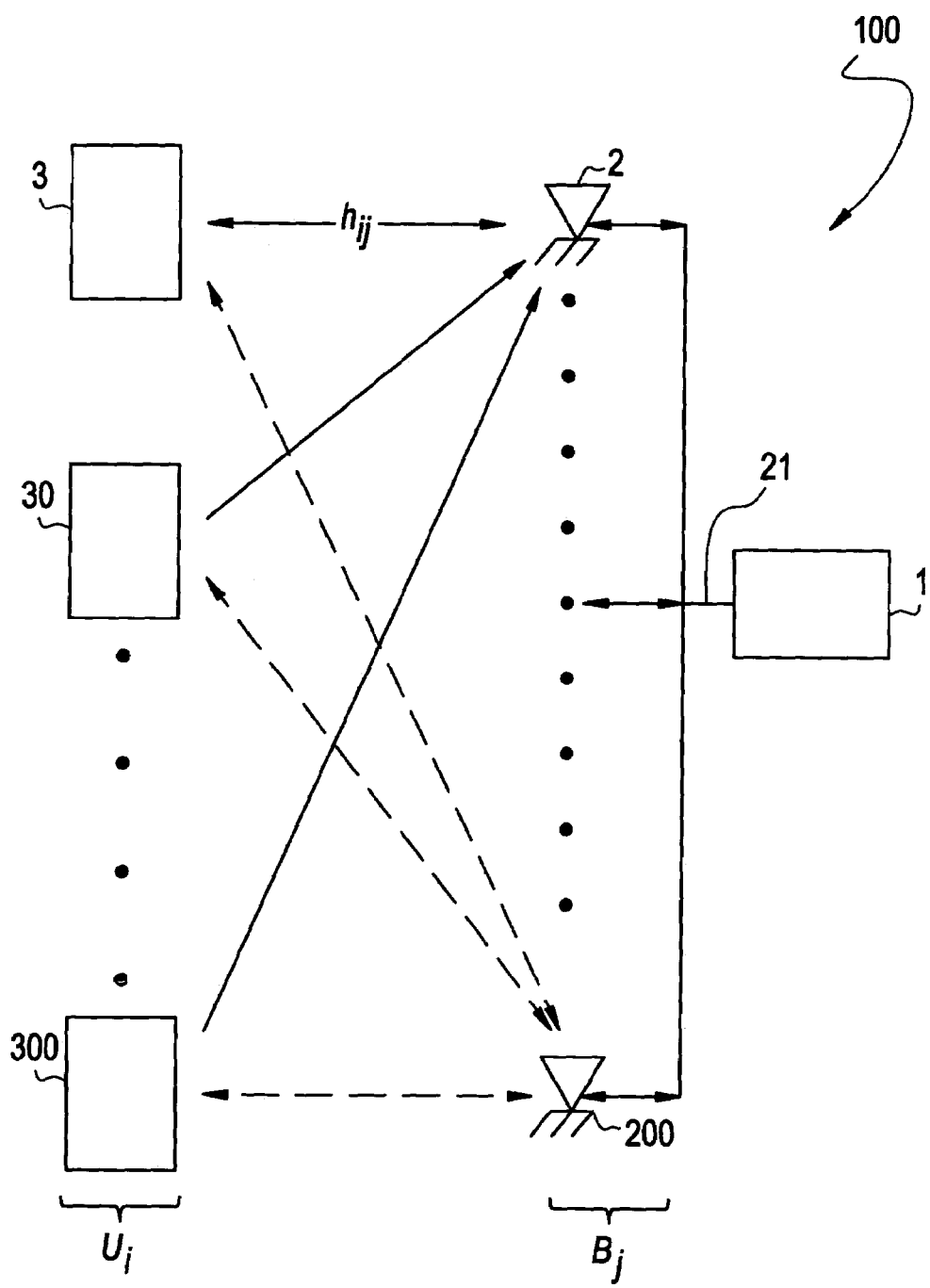
FIG. 1 depicts a plurality of users $U_i$ and a plurality of base stations $B_j$.

Referring to FIG. 1, there is shown a plurality of users $U_1$ each associated with a mobile device 3, 30, . . . 300 and a plurality of base stations 2, . . . , 200 (denoted by $B_j$). The base stations are connected to a device 1 which is used to assign the mobile devices 3, 30, . . . 300 to base stations, 2, . . . , 200.

The present invention provides at least three overall techniques for assigning global devices 3, 30, . . . , 300 to base stations, 2, . . . , 200. The first technique assumes that the mobile devices 3, 30, . . . , 300 are "substantially stationary". That is, the distance traveled by the mobile devices 3, 30, . . . , 300 is relatively small over a given period of time. For example, a user of mobile device 3 may only move around her house over a span of a few hours. "Substantially stationary" may also refer to a situation where the average channel quality is essentially constant for the duration of a telephone call, as described above. However the first technique is also applicable to situations where the present conditions of a channel are known, but where a user's pattern of mobility (e.g., travel routes over a given time period) are unknown. That is to say, the first technique can be used when a user is substantially stationary and when a user is moving, but her expected path is unknown thereby making it impractical to generate expected channel conditions.

In the second technique, it is again assumed that the mobile devices 3, 30, . . . , 300 are substantially stationary, and that the mobile devices have already been assigned to base stations 2, . . . , 200. However the present assignment may not be optimal given the current channel quality and network conditions. Such a situation may arise because the original assignment was determined by a sub-optimal method, or because one or more mobile devices have moved and their channel conditions have changed, or because one or more mobile devices have been added to, or dropped from the network 100. In either case the assignments need to be corrected to take into account new and appropriate levels of interference from the mobile devices.

The third technique applies to the situation where the mobile devices 3, 30, . . . , 300 are substantially moving, implying that the channel conditions between the mobile devices and the base stations are time-varying. However, in addition it is also assumed that the statistical description of the time-varying behavior of channel conditions is known.

In a first embodiment of the invention, the mobile devices 3, 30, ..., 300 are assumed to be substantially stationary as discussed above. Under these conditions, the present invention assigns each of the mobile devices 3, 30, ..., 300 to one of the base stations 2, ..., 200 taking into account the interference from all other mobile devices already assigned to each of the base stations.

More particularly, a network management device 1 or the like is operable to determine an "effective" signal strength associated with a mobile device 3 and a base station 2 wherein the effective signal strength takes into account interference from other mobile devices 30, ..., 300 that may be associated with the base station 2 and all other mobile devices associated with all other base stations that are operating using the same transmission frequency as mobile device 3. For simplicity's sake, it is assumed in the remainder of this discussion that each base station operates on a different frequency, and, therefore, a mobile device(s) associated with one base station does not interfere with a mobile device(s) associated with a different base station. That said, the present invention may be extended to the general case of inter-cell interference without departing from the spirit or scope of the present invention.

Once the effective signal strength between the mobile device 3 and base station 2 has been determined, the effective signal strengths between mobile device 3 and each of the base stations 20, ..., 200 is determined. Once the effective signal strengths between the mobile device 3 and all the base stations 2, ..., 200 are determined, this process is repeated for each of the mobile devices 30, ..., 300. After these effective signal strengths (between all the mobile devices and all possible base stations) are determined, the network device 1 is further operable to compare the determined effective signal strengths and determine the mobile device, base station pair corresponding to the largest effective signal strength, for example.

Before going further, it should be noted that the discussion which follows will assume that the first mobile device determined as just described is device 3 and the first base station is station 2. However, this is merely to simplify the explanation of the techniques envisioned by the present invention. In actuality, any one of the mobile devices 3, 30, ..., 300 and any of the base stations 2, ..., 200 may be determined first.

Network device 1 is then further operable to assign the mobile device 3 to base station 2. The effective signal strengths between each of the mobile devices 30, ..., 300 and each of the base stations 2, ..., 200 (and the signal-to-interference-plus-noise ratios (SINRs) of the mobile device, base station pairs) are updated, by taking into the account the assignment of mobile device 3 to base station 2. This process is then repeated for each of the mobile devices 3, 30, ..., 300 until all of the mobile devices are assigned to a base station 2, ..., 200 by the network device 1.

In an alternative embodiment of the invention, the determination of effective signal strengths may be carried out at the individual base stations, the results of which are then forwarded on to the device 1. In yet another embodiment of the invention, the comparison of effective signal strengths and assignment of mobile devices to a base station may be carried out by one or more of the base stations 2, ..., 200.

Though the discussion above and below focuses on data transmissions originating from a mobile device to a base station, the present invention is equally applicable to data transmissions from a base station to a mobile device.

For simplicity's sake, in the discussion which follows, it will be assumed that the determination of the effective signal strengths, the comparisons and the assignments are all carried out by network management device 1.

Figure 2:
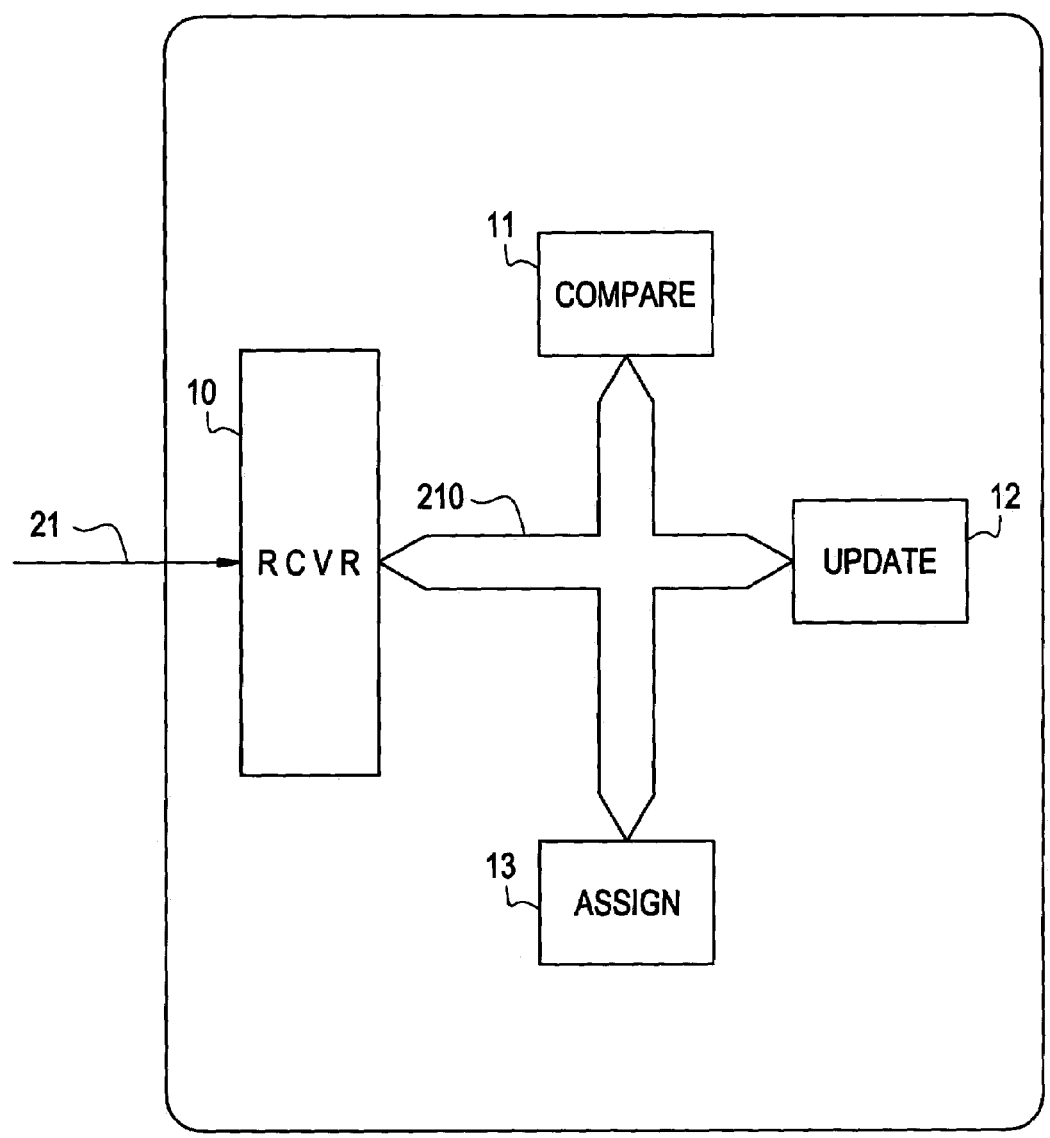
FIG. 2 depicts a simplified block diagram of a device for assigning mobile devices to base stations in the presence of interference according to one embodiment of the present invention.

Referring to FIG. 2, there is shown a simplified block diagram of the device 1. As shown, device 1 may comprise a receiving section 10 operable to determine the effective signal strengths mentioned above, a comparison section 11 operable to carry out the comparisons mentioned above, an assignment section 13 operable to carry out the assignments mentioned above and an updating section 12. It should be understood that the device 1 shown in FIG. 2 is greatly simplified and that one or more of the sections 10-13 may be combined or further broken down into additional sections. Further, it should be understood that one or more of the sections 10-13 may be realized in a combination of hardware, software or firmware.

Continuing, a more detailed discussion of the techniques provided by the invention to assign substantially stationary mobile devices to base stations will now be presented with reference to FIG. 3. FIG. 3 depicts a flow diagram of a technique for assigning substantially stationary mobile devices to base stations according to one embodiment of the invention.

The following is a key to the symbols and notations depicted in FIG. 3:

| | |
|---|---|
| N | Total number of users in the system |
| M | Total number of base stations in the system |
| $P_i$ | Power employed by user $U_i$ |
| $P_{av,i}$ | Average power constraint for each user $U_i$ |
| $h_{ij}$ | Channel gain between transmitter of user $U_i$ and receiver of base station $B_j$ |
| $\sigma_j^2$ | Noise variance at base station $B_j$ (includes out of cell interference) |
| $a_{ij}$ | Assignment variable, $a_{ij} = 1$ if user is $U_i$ assigned to base station $B_j$; otherwise $a_{ij} = 0$ |
| $S_j[n]$ | Set of users assigned to base station $B_j$ at step n of the iterative process. |

Beginning with step 301, it is assumed that constant power $P_{av}$ can be assigned to each of the mobile devices 3, 30, ..., 300 because the mobile devices are substantially stationary (or their future paths are unknown or unpredictable) and therefore the distance between each of the mobile devices and the base stations 2, ..., 200 remains substantially the same, which in turn, means the power needed by each of the mobile devices 3, 30, ... 300 remains unchanged for a given period of time. In step 302, it is assumed that no mobile devices have been assigned to any of the base stations $B_j$ (denoted by the symbol $S_j[0]=\{\ \}$). The value $a_{ij}$ is an "assignment variable" which is initially set to zero, again indicating that no mobile unit is assigned to a base station at the beginning of the assignment process. Because in this initialization step it is assumed that no mobile devices are yet assigned to a base station $B_j$, there exists no interference. Therefore, the signal-to-interference-plus-noise ratio (SINR), denoted $q_{ij}$ in step 302 contains only background noise.

After the initialization step 302, the next step is to measure the SINRs between the first mobile device 3 and each of the base stations 2, ..., 200 in step 303. In one embodiment of the present invention, the receiving section 10 is operable to estimate the SINR between the mobile unit 3 and the base station 2. Each mobile unit and base station set can be referred to as a mobile device, base station "pair". Once the SINR of mobile device, base station pair 3, 2 is determined, the invention envisions determining the SINR between each of the remaining base stations and mobile device 3. Thereafter, the SINR between each of the mobile devices 3, 30, . . . , 300 and each of the base stations 2, . . . , 200 is estimated. In sum, the receiving section 10 is operable to estimate the SINRs of each mobile device, base station pair which can be derived from the wireless network 100 shown in FIG. 1. Once all of the SINRs have been estimated, the comparison section 11 is operable to select a mobile device, base station pair which is associated with a maximum, estimated SINR.

It should be understood that the phrase "SINR of a mobile device, base station pair" means the SINR measured between a particular mobile device and base station. This SINR may be measured at the base station or at the mobile device or at another location.

Having determined the mobile device, base station pair that has the maximum SINR, the invention then envisions assigning the mobile device making up this pair to the base station making up this pair. More specifically, the assignment section 12 is operable to assign the selected mobile device making up the selected pair to the selected base station making up the pair. This assignment is represented by step 304 in FIG. 3.

After a mobile device has been assigned to a base station, the invention then generates a "mobile device, base station SINR" for each of the mobile devices 3, 30, . . . , 300 and each of the base stations 2, . . . , 200. Each mobile device, base station SINR represents an SINR value which is derived by taking into consideration the interference contributed by each mobile device which is connected to the particular base station. As new mobile devices are added to (or deleted from) individual base stations, each of the mobile device, base station SINRs must thereafter be updated to reflect the assignments. In one embodiment of the present invention, the updating section 12 is operable to update each mobile device, base station SINR to include the receive power contributed by each assigned mobile device, in this case mobile device 3. The updating section 12 is further operable to add the selected mobile device to a set of mobile devices assigned to the selected base station 2. If mobile device 3 has been assigned to another base station other than base station 2, then the updating section 12 would be operable to assign the mobile device 3 to the set of assigned mobile devices associated with whatever base station was selected. Finally, for "bookkeeping," the updating section 12 is operable to update the assignment variable to one or zero, whichever is appropriate, whenever a pair is selected. The updating steps are shown in FIG. 3 as steps 305-307, respectively.

As mentioned above, once the mobile device 3 is assigned to a base station, the present invention envisions repeating the same steps until each of the mobile devices is assigned to a base station. To distinguish the mobile devices which have been assigned from the mobile device which is presently being assigned, the notation "next" may be used. That is to say, each subsequent mobile device selected by the technique which needs to be assigned to a base station can be referred to as a "next mobile device." Using this terminology, the present invention provides that the receiving section 10 will be further operable to again update SINRs of mobile device, base station pairs in order to assign the next mobile device to a base station, using the updated SINRs. Once these SINRs are estimated, the comparison section 11 is operable to select the next mobile device, base station pair which is associated with a next maximum, updated SINR. Analogous to the assignment of mobile device 3, the assignment section 13 is then further operable to assign the next selected mobile device which makes up the next selected pair to the base station making up the next selected pair. Similarly, the updating section 12 is operable to add the next, selected mobile device to a set of assigned mobile devices associated with the next selected base station. For example, if the next selected mobile device, base station pair included mobile device 30 and base station 2, then mobile device 30 would be added to the set of assigned mobile devices associated with base station 2. Likewise, if the mobile device base station pair comprised mobile device 30 and base station 200, then mobile device 30 would be added to the set of assigned mobile devices associated with base station 200 instead. Finally, as before, the updating section 12 would be further operable to update all mobile device, base station SINRs to include the receive power of the next selected mobile device at the next selected base station.

In this manner, each of the mobile devices 3, 30, . . . , 300 is assigned to a respective base station 2, . . . , 200 taking into account the interference contributed by every other mobile device that is assigned to each base station.

In the discussion just concluded above, it was assumed that no mobile devices had been previously assigned to any base station. In fact, it can be said that the techniques discussed above provide ways for mobile devices to be initially assigned to base stations. This may occur, for example, when a new network is being constructed and placed into operation or when an older network is being upgraded. The ideas discussed above are not limited, however, to the installation of new networks or the servicing/upgrading of older networks. To the contrary, the techniques discussed above can be applied to networks in operation.

In another embodiment of the present invention, the techniques discussed above can be applied to networks where the mobile devices have already been assigned to base stations using techniques which did not take into account interference values or where interference is considered but the assignments have not been optimized to maximize system throughput. In such a case, it can be said that the techniques discussed above may be used to correct or refine the original assignments. Some mobile devices may need to be "de-assigned" from one base station and "re-assigned" to another.

For example, if mobile devices 3, 30, . . . , 300 have been assigned to base stations based on a measurement of signal strength or received power only, then these assignments may be corrected or refined using the techniques described above and below.

In more detail, the receiving section 10 is once again called upon to update SINRs of each of the mobile devices 3, 30, . . . , 300 and base stations 2, . . . , 200 and, thereafter, to determine, for each mobile device, a base station associated with a maximum mobile device SINR.

At this point, each mobile device has an associated base station where the mobile device SINR is a maximum. It is this base station to which the mobile should be assigned. In actuality, however, the mobile device may, be assigned to a different base station. To account for this, the invention further provides that the comparison section 11 is further operable to compare each base station which has been determined to be associated with a maximum mobile device SINR to a base station which was originally assigned to each mobile device. If the comparison results in a match, then no de-assignment or re-assignment is necessary. However, if the comparison does not result in a match, then the assignment section 12 is operable to de-assign the mobile device from its originally assigned base station and to re-assign the mobile device to the base station which is associated with its maximum SINR. FIG. 4 depicts a flow diagram of the technique(s) for correcting previous mobile device assignments immediately discussed above.

Backtracking somewhat, it may be helpful to the reader to understand how the SINR of a particular mobile device is determined in the situation where all mobile devices have already been assigned to a given base station. In one embodiment of the present invention, the SINR associated with any mobile device is determined by dividing the receive power level of a particular mobile device (as measured at a base station, for example) by the sum of the background noise and the sum of the receive powers of all mobile devices assigned to the same base station, where the sum does not include the receive power associated with the particular mobile device. In another embodiment of the present invention, the SINR associated with a mobile device is determined by dividing the receive power level of the particular mobile device by the sum of the background noise and the sum of the receive powers of all mobile devices transmitting at the same frequency as the particular mobile device (whether they are assigned to the same or a different base station), where the sum does not include the receive power associated with the particular mobile device.

Up to now, we have assumed that the mobile devices are substantially stationary. As indicated at the very beginning of this discussion, the present invention is not so limited. In fact, the present invention is applicable to the assignment of mobile devices to base stations while the mobile devices are in motion.

When mobile devices are in motion and the statistics of their channel conditions are known, it can no longer be assumed that the power being transmitted by each mobile device is equal to an average power, $P_{av}$. Thus, as a mobile device moves farther from or closer to a particular base station, the interference which it contributes to a particular base station is also subject to change. As a result, the SINR value, $q_{ij}$, becomes a time-varying quantity.

The discussion which follows describes one example of an overall technique for assigning mobile devices to base stations, taking into account the time-varying nature of the interference being contributed by each mobile device, while each mobile device is moving. In addition, the discussion which follows also describes one example of varying the transmit power of such mobile devices. Some further comments on the latter idea are appropriate at this time.

As the inventors were developing their techniques to more accurately assign mobile devices to base stations, it occurred to them that once they had accurately determined the effective signal strength between a mobile device and a base station they could use this to determine what power level the mobile device must use to transmit data signals (as opposed to voice signals) at any given point in time to a base station in order to achieve maximum throughput. But, because its power level varies as a mobile device moves, the thought occurred to the inventors that it would be wiser for the mobile device to delay the transmission of certain data signals (e.g., email) until the conditions of a given channel improved or reached a maximum. The ability to transmit the same amount of data signals using a lower power level conserves energy, energy which is a premium in mobile devices which rely primarily on DC battery, storage devices.

The inventors realized that the ability to delay transmissions to a later point in time was probably not practical when it came to the transmission of voice signals, but, nonetheless, was practical if only data signals were sought to be transmitted. For example, email messages and facsimile messages can be received seconds or minutes after their transmission and still be understandable while voice transmissions may be garbled if some or all of the information contained in such a voice transmission is delayed.

In sum, the inventors realized that they could develop techniques that could be used to assign mobile devices to base stations more accurately, while at the same time assigning transmit power levels to such mobile devices which would allow power to be used more efficiently when such devices sought to transmit data signals by delaying the transmissions until such time as the power requirements had become reduced (e.g., when the quality of a given channel increases due to a decrease in interference, the amount of power needed to transmit a given amount of data signals is reduced, or equivalently, the amount of data signals that can be transmitted for a given amount of power is increased, thereby achieving greater energy efficiency).

FIG. 5 depicts a flow diagram of one example of a technique for assigning mobile devices, which are moving, to base stations, taking into account interference values, and also assigning appropriate transmit power levels. The following is a key to the notation and symbols used in FIG. 5:

| | |
|---|---|
| H | Matrix of channel power gains $h_{ij}^2$ where $h_{ij}$ is the channel gain between transmitter of user $U_i$ and receiver of base station $B_j$. |
| $f_i(H)$ | Probability density function of the channel gains of user $U_i$. |
| $P_i(H)$ | Transmit power of user $U_i$ as a function of the channel gains of all the users. |
| $\alpha_i(H)$ | Assignment variable of user $U_i$ as a function of the channel gains of all the users. If $\alpha_i(H) = j$, user $U_i$ is assigned to base station $B_j$. |
| $\lambda_i$ | Set of Lagrange multipliers, i.e., parameters to be determined |
| $\beta$ | Constant parameter chosen to regulate the speed of convergence of the power control process. For example, $\beta = 10$. |

In one embodiment of the present invention, it is envisioned that the transmit power levels and the assignment of mobile devices to base stations are calculated in an iterative procedure. The first step in such a technique is an initialization step 501 where: the transmit power used by each mobile device is initialized to zero; where the assignment variable is initialized to zero; and where a cost parameter $\lambda_i$ is initialized to one.

In one embodiment of the present invention, the network management device 1 shown in FIGS. 1 and 2 is operable to generate histogram of channel conditions. The histogram represents the probability of occurrence of a given set of channel conditions between every mobile device and base station. The device 1 takes each set of conditions and generates a unique matrix, H for each set of possible channel conditions. It can be said that the histogram comprises the number of times each matrix H of channel conditions is estimated to occur.

Each matrix H is generated based on present and historical channel conditions.

Once all of the matrices are generated, the device 1 is further operable to select one of the matrices and to further normalize the matrix using the cost parameter, $\lambda_i$ in step 502.

In actual use, the generated matrices will be quite sophisticated and contain many elements. Each matrix may be thought of as being rows and columns where the columns represent the base stations which mobile devices will be assigned to while the rows represent the mobile devices to be assigned.

Continuing, the next step is to select an element within a selected normalized matrix which is the largest. In one embodiment of the present invention, the network device 1 is further operable to assign a mobile device to a base station associated with the element in the selected matrix which indicates a maximum value at steps 503 and 504.

Once this element has been identified, its corresponding row and column are deleted from the matrix leaving a smaller matrix from which to select the element associated with the next highest value in order to assign the next mobile device to the next base station. The deletion of the corresponding row and column in the matrix is shown in step 505.

Having assigned the mobile device to an appropriate base station, the technique now assigns an appropriate power level. The network management device 1 is further operable to assign a power level to the assigned mobile device taking into consideration the assigned base station to which the mobile device has been assigned in step 506. It should be noted that although FIG. 5 shows steps in one sequence, this sequence may be modified without departing from the spirit and scope of the present invention. For example, step 506, which is the power allocation, may in fact come before the deletion of the row and column associated with a maximum matrix value which is step 505.

Once the first mobile has been assigned and its power level has been assigned, the process is repeated until all the rows and the columns of the original normalized matrix have been deleted [Note that not all mobile devices may be assigned for each channel matrix]. In accordance with the present invention, once a selected matrix has been reduced by eliminating the row and column associated with the maximum value, the next maximum value is selected which corresponds to a next element from such a revised matrix. This next element represents the next highest maximum value which remains in a revised matrix. In a further embodiment of the present invention, the device 1 is operable to assign the next mobile device to the next base station associated with the next maximum value element in the matrix. Thereafter, the appropriate transmit power level is also selected. In sum, steps 503 through 506 are repeated until all rows and columns in a matrix have been deleted, in step 507. At this point, all the mobile devices which could be assigned to an appropriate base station using the selected matrix have been assigned. As mentioned above, however, it should be noted that some mobile devices may not be assigned until later in the process using a different selected matrix. Still further, some mobile devices may not be assigned at all.

As indicated above, there exists a plurality of matrices, each matrix associated with a set of channel conditions, between all of the mobile devices 3,30 . . . ,300 and base stations 2, . . . , 200, which are generated by device 1. In a further embodiment of the invention, steps 501 through 507 are repeated for each matrix generated by device 1. Upon completion of the last matrix, whichever mobile devices could be assigned to an appropriate base station and power level, have been assigned. Again, not all of the mobile devices may, in fact, be so assigned (step 508).

There is one further constraint on transmit power levels which must be considered before each of the mobile devices can actually transmit at the selected power levels. There is a certain cost associated with any given transmit power level. Mobile devices typically rely on batteries of some sort for their power. Therefore, the average power level used by a mobile device for transmitting data acts as a constraint on the power level which can be assigned to a particular mobile device. If too high a power level is assigned, the efficiency and useful life of a given mobile device's battery will decrease. Taking this into account, the present invention envisions calculating an average transmit power level for each mobile device in step 509 and comparing this average transmit power level to a maximum average transmit power level which acts as a constraint to insure battery efficiencies and lifetimes are considered (step 510).

If the average transmit power level is below the maximum average transmit power level, then the cost parameter associated with the mobile device is revised (step 511). Because the cost parameter is used to generate the normalized matrices, a revision in the cost parameter may result in a re-assignment of a mobile device to a different base station and a re-selection of a different transmit power level.

In accordance with the present invention, steps 502 through 511 generate assignment functions of mobile devices to base stations and transmit power levels for each of the mobile devices. Steps 502 through 511 are repeated until the average transmit power level substantially equals the maximum average transmit power level for each mobile device (step 511). The mobile devices are then assigned to the base stations corresponding to the final assignment functions and the actual transmit power levels of the mobile devices are set according to the final transmit power levels in the iterative procedure.

The examples set forth above sought to provide an explanation for the techniques envisioned by the present invention. It is next to impossible to set forth each and every example within the spirit and scope of the present invention as defined by the claims which follow:

We claim:

1. A method for assigning a mobile device to a base station and assigning a transmit power level comprising:
 (a) generating a plurality of matrices of channel conditions between each mobile device and each base station;
 (b) selecting one of the generated matrices;
 (c) normalizing the channel matrix using a cost parameter;
 (d) assigning a mobile device to a base station associated with an element from the matrix which indicates a maximum value;
 (e) assigning a power level the assigned mobile device may transmit data signals at upon being assigned to the base station associated with the maximum value element;
 (f) deleting those elements in the same matrix row and column as the maximum value element to form a revised matrix;
 (g) selecting a next element associated with a next maximum value from the revised matrix;
 (h) assigning a next mobile device to a next base station associated with the next element;
 (i) assigning a power level to the next mobile device that it may transmit data signals at upon being assigned to the base station associated with the next maximum value element;
 (j) repeating steps (d) through (i) until all elements of the original matrix have been selected or deleted;
 (k) repeating steps (b) through (j) for all possible channel matrices;
 (l) calculating the average transmit power level used for each mobile device;

(m) comparing the average transmit power level used by each mobile device to a maximum average transmit power level available to each mobile device;

(n) revising a cost parameter based on the comparison of the average transmit power level used by each mobile device to the maximum average transmit power level; and (o) repeating steps (b) through (n) until the average transmit power level used by each mobile device coincides with the maximum average transmit power level for each mobile device.

2. The method as in claim 1 further comprising assigning a plurality of mobile devices to a plurality of base stations and assigning each mobile device a transmit power level for the transmission of data signals.

3. The method as in claim 1 further comprising:
recording the base station assignments for each mobile device; and
recording transmit power levels for each mobile device.

4. A device operable to assign a mobile device to a base station and assign a transmit power level, the device further operable to:

(a) generate a plurality of matrices of channel conditions between each mobile device and each base station;

(b) select one of the generated matrices;

(c) normalize the channel matrix using a cost parameter;

(d) assign a mobile device to a base station associated with an element from the matrix which indicates a maximum value;

(e) assign a power level the assigned mobile device may transmit data signals at upon being assigned to the base station associated with the maximum value element;

(f) delete those elements in the same matrix row and column as the maximum value element to form a revised matrix;

(g) select a next element associated with a next maximum value from the revised matrix;

(h) assign a next mobile device to a next base station associated with the next element;

(i) assign a power level to the next mobile device that it may transmit data signals at upon being assigned to the base station associated with the next maximum value element;

(j) repeat steps (d) through (i) until all elements of the original matrix have been selected or deleted;

(k) repeat steps (b) through (j) for all possible channel matrices;

(l) calculate the average transmit power level used for each mobile device;

(m) compare the average transmit power level used by each mobile device to a maximum average transmit power level available to each mobile device;

(n) revise a cost parameter based on the comparison of the average transmit power level used by each mobile device to the maximum average transmit power level; and (o) repeat steps (b) through (n) until the average transmit power level used by each mobile device coincides with the maximum average transmit power level for each mobile device.

5. The device as in claim 4 further operable to assign a plurality of mobile devices to a plurality of base stations and to assign each mobile transmit power level for the transmission of data signals.

6. The device as in claim 4 further operable to:
record the base station assignments for each mobile device; and
record transmit power levels for each mobile device.

* * * * *